No. 700,503. Patented May 20, 1902.
J. R. JONES.
PLANTER AND CULTIVATOR.
(Application filed Sept. 13, 1901.)
(No Model.)
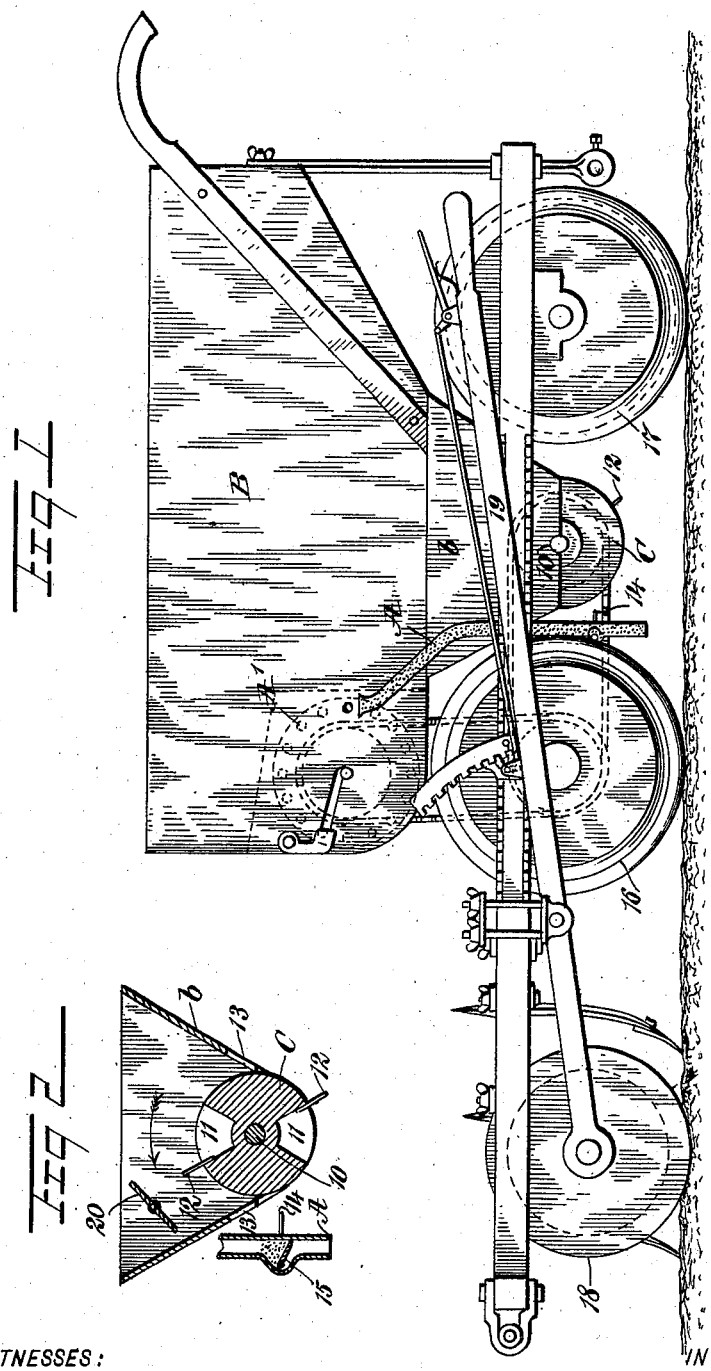
WITNESSES:
INVENTOR
Jesse R. Jones
BY
ATTORNEYS
THE NORRIS PETERS CO., PHOTO-LITHO., WASHINGTON, D. C.

UNITED STATES PATENT OFFICE.

JESSE RUBLE JONES, OF JACKSON, MISSISSIPPI.

PLANTER AND CULTIVATOR.

SPECIFICATION forming part of Letters Patent No. 700,503, dated May 20, 1902.

Original application filed May 7, 1901, Serial No. 50,185. Divided and this application filed September 13, 1901. Serial No. 75,277. (No model.)

*To all whom it may concern:*

Be it known that I, JESSE RUBLE JONES, a citizen of the United States, and a resident of Jackson, in the county of Hinds and State of Mississippi, have invented a new and Improved Planter and Cultivator, of which the following is a full, clear, and exact description, this being a division of an application made by me for Letters Patent for a planter and cultivator filed May 7, 1901, Serial No. 50,185.

The purpose of the invention is to provide a seedbox and fertilizer-distributer and means for releasing and dropping the seed through the action of the fertilizer-distributer to cause fertilizing material to be dropped upon or near the seed after the seed has reached the ground.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a side elevation of an implement having the improvement applied; and Fig. 2 is a vertical section through the lower portion of a receptacle adapted to contain fertilizing material, the section being also taken through the fertilizer-distributer and through a portion of the seed-conducting tube or boot, illustrating a retarding-valve in said tube or boot operated by the fertilizer-distributer.

In the form of planter in connection with which my improvement is illustrated the seed is deposited in a seed-conducting tube or boot A through the medium of a dropping device A', arranged to deliver the seed at one or both sides of the hopper B, in a portion of which the said seed-dropping device is located; but the improvement may be used in connection with any form of planter, but especially those adapted to deposit fertilizing material with the seed.

The hopper B is mainly designed to carry the fertilizer and is shown mounted upon a wheel-supported frame and as provided with a lower tapering extension $b$ and a partition which separates the main portion of the hopper from that portion in which the seed-dropping device is located. In the bottom of this extension a distributing-wheel C is mounted upon a shaft 10 and is driven in any approved manner. The distributing-wheel C extends below the under edge of the extension $b$ and is provided with pockets 11, shown arranged opposite each other in Fig. 2. The wheel C closes the bottom portion of the extension $b$, and a finger 12 is attached to the wall of each pocket, the fingers extending beyond the periphery of the wheel C, as is also best shown in Fig. 2. Slight openings 13 are made in opposite sides of the extension $b$, through which the projecting portions of the fingers may pass as the wheels revolve. The seed-conducting tube or boot A extends down at one side of the extension $b$, and as the distributing-wheel revolves and before the contents of the pockets 11 are dumped a finger 12 engages with a handle 14, attached to a valve 15, located in the seed-conducting tube or boot. When the finger 12 engages with the valve handle or projection 14, the valve 15 is opened and the seed temporarily held in the tube or boot A will fall to the ground, and almost immediately the contents of the pocket 11 will be dumped on the seed or upon the ground near the seed.

The wheel C is removable and may be substituted by a slotted plate, the slots being adjustable to desired width through the medium of the ordinary sliding plate and set-screws. By means of this latter device the fertilizer is deposited in a continuous drill.

In connection with the frame of the device I have illustrated a furrow-opener 16 in front of the distributing-wheel C and a covering-wheel 17 at the rear of the distributing-wheel. The frame is also shown with forward supporting-wheels 18, raised and lowered by levers 19, leading to the rear.

In connection with the extension $b$ I preferably employ an agitator 20 to break up lumps, which agitator is located above the distributing-wheel and is mounted upon a suitable shaft driven in any approved manner.

Having thus described my invention, I claim as new and desire to secure by Letters Patent—

1. In a planter, a hopper, a seed-conducting tube or boot, a valve within the said tube or boot having a section extending out therefrom, and a wheel mounted to revolve in the hopper, provided with projections adapted to engage with the projecting portion of the valve, whereby the said valve is operated by the said wheel and the valve brought in position to temporarily hold the seed in the said tube and dump the same at the proper moment, as described.

2. In planters and like machines, a frame, a receptacle located upon said frame, said receptacle being provided with a partition forming chambers therein, an outlet for the larger chamber, which chamber is adapted to receive a fertilizing material, a distributing-wheel provided with pockets mounted to revolve in the outlet portion of said larger chamber, a portion of the periphery of the wheel extending beyond said outlet, a finger secured to a wall of each of the said pockets, a seed-distributing tube, and a retaining-valve located within the said seed-distributing tube and operated by the fingers located in the pockets of the fertilizer-distributing wheel, as set forth.

In testimony whereof I have signed my name to this specification in the presence of two subscribing witnesses.

JESSE RUBLE JONES.

Witnesses:
D. H. HOLDER,
REUBEN T. CLARK.